Figure 1:
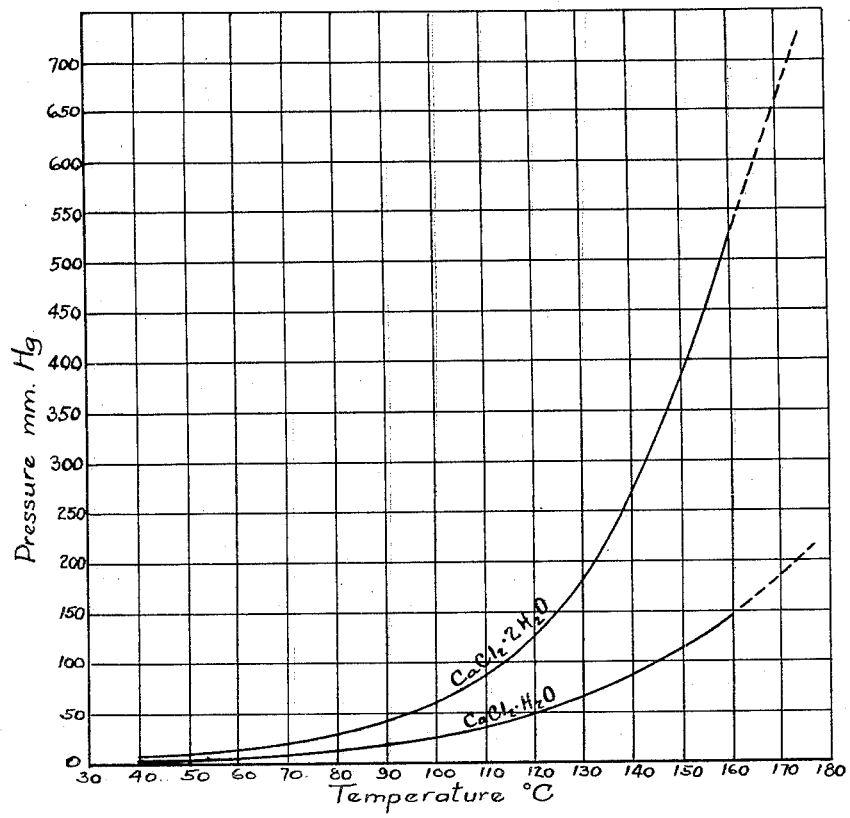

Aug. 15, 1933.  S. B. HEATH  1,922,697

PREPARED CALCIUM CHLORIDE AND METHOD OF MAKING SAME

Filed Nov. 4, 1929

INVENTOR
Sheldon B. Heath
BY Thomas Griswold, Jr.
ATTORNEY

Patented Aug. 15, 1933

1,922,697

UNITED STATES PATENT OFFICE 1,922,697

PREPARED CALCIUM CHLORIDE AND METHOD OF MAKING SAME

Sheldon B. Heath, Midland, Mich., assignor to The Dow Chemical Company, Midland, Mich., a Corporation of Michigan Application November 4, 1929. Serial No. 404,698

6 Claims. (Cl. 23—90)

This invention relates to methods for dehydrating calcium chloride, and in particular to a method whereby a hydrated form thereof is air-dried in such way as to yield an improved product of uniform physical structure having the composition of a definite hydrate of a lower degree of hydration than the starting material.

As is well known, there exists a series of hydrated forms of calcium chloride, each having a definite transition point or temperature whereat the solid hydrate appears to melt and is transformed into a mixture of solid hydrate of next lower degree of hydration and saturated solution of $CaCl_2$. The accompanying table includes the several hydrates, the percentage $CaCl_2$ content and the transition temperature thereof:

| Formula | Percent $CaCl_2$ | Transition point |
|---|---|---|
| $CaCl_2.6H_2O$ | 50.7 | 30° C. |
| $CaCl_2.4H_2O$ | 60.6 | 45° C. |
| $CaCl_2.2H_2O$ | 75.5 | 175° C. |
| $CaCl_2.H_2O$ | 86.0 | 260° C. |

It is also well known that concentrated aqueous solutions of calcium chloride can be evaporated by boiling at atmospheric pressure only up to a maximum temperature of about 178° C., and such temperature may be reached only when the solution is boiled rapidly enough to cause superheating. The product obtained thereby analyzes on an average about 71 to 73 per cent $CaCl_2$. In other words, the product contains somewhat less $CaCl_2$ than corresponds to the dihydrate, $CaCl_2.2H_2O$, being therefore a mixture consisting principally of the dihydrate with a smaller amount of the tetrahydrate. When this solidified product is exposed to a temperature of only 45° C. (113° F.), the transition point of the tetrahydrate, the latter constituent thereof liquefies. If the product has been prepared in divided form by granulating, flaking or otherwise, the solid particles will be to a certain extent fused or agglomerated together by the liquid so formed, and upon cooling again will coalesce producing a more or less solid mass which is difficult to remove from the package and is much less convenient and desirable for use. In order to prevent such contingency from arising, the customary practice has been to air-dry the comminuted particles, as by the process of U. S. Patent 1,527,121 to Cottringer and Collings, until the $CaCl_2$ content thereof has been raised to 75.5 per cent or above, that is, to the average composition of the dihydrate or somewhat above. A material of such composition will not liquefy unless heated to a temperature of 175° C., provided of course, no absorption of moisture occurs to lower the $CaCl_2$ content below 75.5 per cent. Such air-dried product consists of particles of heterogeneous structure having a solid core of approximately the original composition of the material enclosed or encased in a shell or envelope of less highly hydrated material. The envelope has a relatively porous structure, due to the expulsion of water therefrom on drying, but the core is dense and solid and only slowly permeable to moisture. For greater ease of solution it would be preferable to obtain a product having a homogeneous structure similar to that of the envelope of the surface-dried particles, but such a product is not readily prepared by means of methods heretofore employed or proposed.

A homogeneous calcium chloride, together with a method of making same, is described in U. S. Patent 1,660,053 to A. K. Smith. The method therein described consists in evaporating fused hydrated calcium chloride under pressure at a temperature up to about 190° C., and then solidifying and comminuting the fused salt. The product thereby obtained consists of particles of substantially uniform composition analyzing between 75.5 and 86 per cent $CaCl_2$, therefore consisting either of the pure dihydrate, $CaCl_2.2H_2O$, at a composition of 75.5 per cent $CaCl_2$, or of the monohydrate, $CaCl_2.H_2O$, at a composition of 86 per cent $CaCl_2$, or of a mixture of the two hydrates having an intermediate composition. The particles so prepared, however, are relatively hard and dense, and consequently suffer to an even greater extent from the disadvantage of the surface-dried product, in that the dense particles go into solution or absorb moisture much less rapidly than would be the case with a material having a porous structure similar to that of the outer coating of the surface-dried salt.

I have now devised a new and improved method for dehydrating calcium chloride whereby a homogeneous product may be prepared, said product having throughout the open and porous structure just referred to, and the following is a full and complete description of my invention.

Generally speaking, the present method consists in air-drying a divided form of hydrated calcium chloride, such, for example, as may be prepared by usual methods and containing from about 71 to 73 per cent $CaCl_2$, by contact with a heated aeriform current under conditions of controlled temperature and humidity such that the material is dried completely to a lower hydrate of definite composition substantially free from the accompaniment of any other hydrate. The particles are homogeneous in structure and are more porous and have a lower density than any similar product hitherto commercially available, as well as dissolving more rapidly in water and absorbing moisture more readily.

Figure 2:
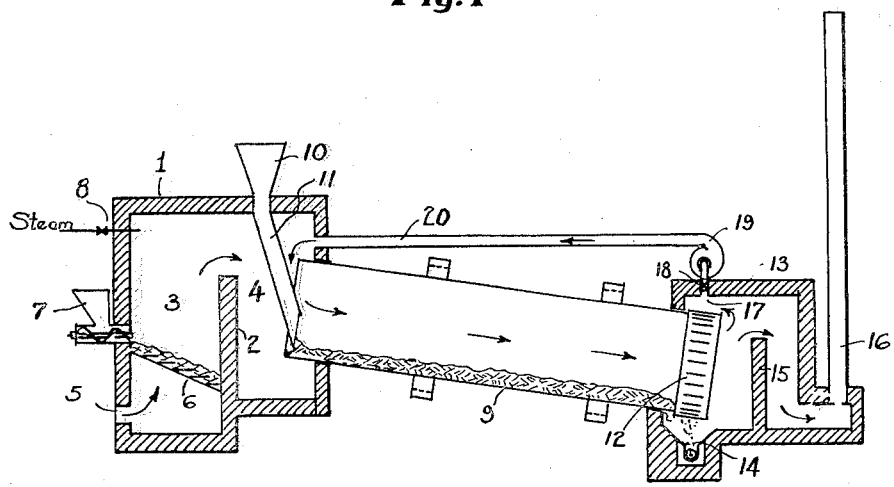

In the annexed drawing, Fig. 1 is a chart showing the water vapor pressure curves of $CaCl_2.2H_2O$ and $CaCl_2.H_2O$, respectively. Fig. 2 represents diagrammatically a form of apparatus adapted for carrying out the method of my invention, but it will be understood that I do not restrict myself to such form or arrangement of apparatus.

The curves in Fig. 1 show the water vapor pressure in millimeters of mercury of the hydrated salts $CaCl_2.2H_2O$ and $CaCl_2.H_2O$ plotted against the temperature in degrees centigrade. Taking a temperature of 150° C., for example, the vapor pressure of the dihydrate is 380 mm., while that of the monohydrate is 114 mm. Either hydrate can be dehydrated at that temperature if the partial pressure of water vapor of the atmosphere in contact therewith is less than 114 mm., but if such partial pressure is higher than 114 mm., and less than 380 mm., only the dihydrate may be dehydrated. By regulating the humidity of the drying atmosphere so that it is maintained within the area contained between the two curves it is feasible to dry a hydrated calcium chloride having a composition, say, approximating that of the dihydrate so that the final product consists entirely of the monohydrate without the presence of any material amount of any other hydrated, or the anhydrous, form of the salt.

Referring to the apparatus illustrated in Fig. 2, the arrangement there shown provides for parallel flow of material and drying gases but the invention is not limited to such mode of operation. Furnace 1 is divided by baffle wall 2 into a combustion chamber 3 and a mixing chamber 4. Air is admitted through draft opening 5 beneath the grate 6. Fuel is supplied by a mechanical stoker 7, and an inlet 8 is provided for admitting steam to the furnace gases. A rotary dryer 9 is connected with chamber 4, being inclined therefrom, as shown, to forward the charge in the direction to the right. Material is fed to dryer 9 from hopper 10 through chute 11. The discharge end 12 of dryer 9 is enclosed within a dust chamber 13. Discharged material drops into a trough 14, shown as containing a screw type conveyor for forwarding the material to a receiver or storage bin not shown. Exit gases from dryer 9 are deflected by baffle wall 15 and pass thence to stack 16. An auxiliary gas outlet 17, controlled by valve 18, is connected with exhauster fan 19, the latter discharging into pipe 20 which leads back to mixing chamber 4.

In operating the apparatus just described, raw material, e. g. a flake calcium chloride containing about 71 to 73 per cent $CaCl_2$, is fed into the upper end of dryer 9 where it is exposed to the hot combustion gases from furnace 1, the temperature of the gases being preferably controlled between about 350° and 500° C. which in practice has been found sufficient to heat the charge to a temperature of about 150° C. to 160° C., depending upon the relative conditions of material feed and gas flow advantageously maintained in the process. The moisture content or humidity of the heating gases entering the dryer is to be adjusted to a figure in excess of or, at least, closely approaching that corresponding to the vapor pressure of calcium chloride monohydrate at the temperature of the salt charge in the dryer. For so adjusting the humidity, as well as the temperature of the inlet gases, a portion of the moist exit gases from the dryer may be returned by means of fan 19 and pipe 20 and mixed therewith, while any additional steam required to raise the humidity to the desired point may be admitted at 8. The rate of feed of material and speed of rotation of the dryer are so regulated that the material discharged at 12 has a uniform composition substantially of the monohydrate. In order to faciliate a thorough mixture of the salt during the drying and to insure maximum exposure of all particles to the drying atmosphere, the dryer may be equipped with internally projecting ribs, vanes, shelves, or the like, adapted to carry the material up on the side of the dryer during rotation and then cause it to fall back in a dispersed condition through the stream of drying gases.

An essential feature of the present method consists in the proper control of the humidity of the drying gases by recycling a portion of the moist exit gases and injecting additional steam, if required. Whatever the actual temperature of the charge may be at any stage of passage through the dryer, the vapor pressure of the atmosphere in contact therewith is preferably to be maintained within the range as shown by the area included between the two curves in Fig. 1, so that the material will be dried to the composition of the monohydrate but will undergo no further drying of any portion of the latter to the anhydrous salt. Practically speaking, however, the humidity of the drying gases when admitted to the dryer and during the early part of the drying operation may be permitted to fall slightly below the prescribed lower limit without materially affecting the final result. Inasmuch as the gases will take up moisture rapidly enough from the fresh hydrated salt fed to the dryer to acquire a sufficient degree of saturation almost immediately, there will be virtually no opportunity for any of the salt to be dried beyond the desired hydrate before proper humidification of the atmosphere takes place. It is simply essential, therefore, to maintain control of the water vapor pressure of the atmosphere within the dryer only toward the latter part of the drying operation in order to accomplish the desired result.

The product obtained by means of my improved method has a characteristic appearance, consisting of opaque particles having a dull, amorphous fracture, as distinguished from the sharp crystalline fracture of the core of the surface-dried particles. My new product is homogeneous in composition, form and appearance, having an analysis of approximately 86 per cent $CaCl_2$ corresponding to the monohydrate, and possesses a high degree of porosity and permeability to water. The particles are, and will remain, free flowing and non-caking in the package when exposed to any temperature up to about 260° C. They can absorb nearly 14 per cent by weight of water before reaching a composition at which any tendency to agglomerate or coalesce at a temperature below 175° C. is manifested. Furthermore, the product absorbs moisture and dissolves in water more freely and rapidly than any of the present commercial forms of calcium chloride.

The same principle herein described with reference to drying calcium chloride dihydrate to the monohydrate may likewise be employed for drying any other hydrate, or a material containing the same, to a homogeneous product having the composition of any desired lower hydrate.

Other modes of applying the principle of my invention may be employed instead of those explained, change being made as regards the method herein disclosed, provided the means stated by any of the following claims or the equivalent of such stated means be employed.

I therefore particularly point out and distinctly claim as my invention:—

1. The method of preparing a partially dehydrated calcium chloride having a uniform composition corresponding to a definite hydrate thereof which comprises heating any hydrated form thereof higher than the monohydrate in a comminuted condition to a temperature at which water vapor is evolved therefrom but below the temperature of incipient fusion, while in contact with an aeriform current in which the partial pressure of water vapor is maintained above the vapor pressure of the next lower hydrated form thereof but below that of the hydrate being dried at the existing temperature, withdrawing a portion of the moist exit gases and reintroducing the same into said aeriform current in the drying step to supply at least a part of the water vapor therein.

2. The method of preparing a partially dehydrated calcium chloride having a uniform composition corresponding to a definite hydrate thereof which comprises heating any hydrated form thereof higher than the monohydrate in a comminuted condition to a temperature at which water vapor is evolved therefrom but below the temperature of incipient fusion, while in contact with an aeriform current in which the partial pressure of water vapor is maintained above the vapor pressure of the monohydrate but below that of the dihydrate at the existing temperature, withdrawing a portion of the moist exit gases and reintroducing the same into said aeriform current in the drying step to supply at least a part of the water vapor therein.

3. The method of preparing a divided form of calcium chloride having a uniform composition corresponding to the monohydrate thereof which comprises heating particles of composition approximating that of the dihydrate to a temperature at which water vapor is evolved therefrom but below the temperature of incipient fusion, while in contact with an aeriform current in which the partial pressure of water vapor is maintained above the vapor pressure of the monohydrate but below that of the dihydrate at the existing temperature, withdrawing a portion of the moist exit gases and reintroducing the same into said aeriform current in the drying step to supply at least a part of the water vapor therein.

4. The method of preparing a divided form of calcium chloride having a uniform composition corresponding to the monohydrate thereof which comprises continuously forwarding a stream of particles of composition approximating that of the dihydrate in contact with a heated aeriform current at a temperature sufficient to expel water vapor therefrom but below the temperature of incipient fusion, the partial pressure of water vapor of said current being maintained above the vapor pressure of the monohydrate but below that of the dihydrate at the existing temperature, returning a portion of the moist exit gases and intermixing same with said aeriform current to supply at least a part of the water vapor therein.

5. The method of preparing a divided form of calcium chloride having a uniform composition corresponding to the monohydrate thereof which comprises continuously forwarding a stream of particles of composition approximating that of the dihydrate in contact with a heated aeriform current at a temperature sufficient to expel water vapor therefrom but below the temperature of incipient fusion thereof and maintaining the partial pressure of water vapor of said current above the vapor pressure of the monohydrate but below that of the dihydrate at the existing temperature at least during the latter part of the said step, returning a portion of the moist exit gases and intermixing same with said aeriform current to supply at least a part of the water vapor therein.

6. The method of preparing an intermediate hydrated form of a salt capable of forming a series of crystalline hydrates which comprises heating any hydrated form of the salt higher than the lowest hydrated form thereof in a comminuted condition at a temperature whereat water vapor is evolved therefrom but below the temperature of incipient fusion, while in contact with an aeriform current in which the partial pressure of water vapor is maintained above the vapor pressure of the intermediate hydrate to be formed but below that of the next higher hydrate at the temperature in question, withdrawing a portion of the moist exit gases and reintroducing the same into said aeriform current in the drying step to supply at least a part of the water vapor therein.

SHELDON B. HEATH.